(12) United States Patent
Johnson et al.

(10) Patent No.: US 6,202,540 B1
(45) Date of Patent: Mar. 20, 2001

(54) BEVERAGE QUALITY CONTROL APPARATUS AND METHOD

(75) Inventors: Michael W. Johnson, Saint Helens; Christopher J. Engler, Portland, both of OR (US)

(73) Assignee: Boyd Coffee Company, Portland, OR (US)

( * ) Notice: Subject to any disclaimer, the term of this patent is extended or adjusted under 35 U.S.C. 154(b) by 0 days.

(21) Appl. No.: 09/532,104

(22) Filed: Mar. 21, 2000

Related U.S. Application Data

(63) Continuation of application No. 09/245,578, filed on Feb. 5, 1999, now Pat. No. 6,062,126.

(51) Int. Cl.⁷ ............... A47J 31/00; G08B 17/00
(52) U.S. Cl. ............ 99/285; 99/323.3; 340/691.6; 340/309.15; 374/102; 374/141
(58) Field of Search ............... 99/285, 343, 323.3, 99/342, 275, 279, 328, 333; 340/691.6, 309.15, 586, 588, 589; 374/141, 142, 150, 102, 104, 106

(56) References Cited

U.S. PATENT DOCUMENTS

| | | | |
|---|---|---|---|
| 3,965,741 | * 6/1976 | Wachtell et al. | 374/102 |
| 3,967,502 | * 7/1976 | Moran | 374/102 X |
| 4,298,143 | 11/1981 | Peterson | 222/70 |
| 4,621,571 | 11/1986 | Roberts | 99/280 |
| 4,790,239 | 12/1988 | Hewitt | 99/279 |
| 4,838,152 | 6/1989 | Kubicko et al. | 99/280 |
| 5,229,751 | 7/1993 | Chandler et al. | 340/680 |
| 5,239,519 | 8/1993 | Nelson et al. | 368/10 |
| 5,774,425 | * 6/1998 | Ivanov et al. | 374/102 X |
| 5,923,257 | 7/1999 | Nolte | 340/584 |
| 6,062,126 | 5/2000 | Johnson et al. | 99/285 |

OTHER PUBLICATIONS

Photograph of a manually operated indicator dial attached to a coffee pot, Feb. 1999.

* cited by examiner

*Primary Examiner*—Reginald L. Alexander
(74) *Attorney, Agent, or Firm*—Kolisch, Hartwell, Dickinson, McCormack & Heuser

(57) ABSTRACT

A quality control apparatus for a beverage held in a beverage container. The apparatus includes a sensor configured to be in thermal communication with the beverage and detect attainment of a first predetermined temperature. The apparatus also includes a timer coupled with the sensor. The timer is configured to commence timing in response to detection of the attainment of the first predetermined temperature by the sensor. The apparatus also typically includes an indicator coupled to the timer and configured to indicate to a user a status of the timer.

25 Claims, 4 Drawing Sheets

BEVERAGE QUALITY CONTROL APPARATUS AND METHOD

CROSS REFERENCE TO RELATED APPLICATION

This is a continuation of application Ser. No. 09/245,578, filed Feb. 5, 1999 now U.S. Pat. No. 6,062,126 for a BEVERAGE QUALITY CONTROL APPARATUS AND METHOD. The subject matter of that application is incorporated herein by this reference.

TECHNICAL FIELD

This invention relates generally to beverages, and more particularly to a quality control apparatus for a beverage container.

BACKGROUND OF THE INVENTION

In restaurants and cafes, coffee often is brewed into decanters, such as glass coffee pots, which are placed on hot plates to keep the coffee warm. Coffee typically is brewed at a temperature near 200° F., and kept warm at a temperature near 180° F. At these high temperatures, coffee breaks down over time, and becomes bitter and distasteful to the consumer. Therefore, old coffee periodically is thrown out and replaced with freshly brewed coffee. However, the hectic pace in a restaurant or cafe can cause the waitstaff to forget how long a given pot of coffee has been on the hot plate.

One current device to prevent broken-down coffee from being served is a plastic dial indicator shaped in the form of a clock face that clips around the outside of the neck of a coffee pot. The clock face includes hands that may be rotated by a user to show the time that the pot was brewed. Although the indicator has the face of a clock, it does not keep time.

Such a dial indicator device suffers from several problems. During the workday, waitstaff often are rushed, and may set the dial indicator some time before or after the coffee was brewed, or forget to set the dial indicator at all. Where the dial indicator is set when the coffee is brewed, it may be set to an incorrect time. When it is time to throw the coffee out, the waitstaff may notice the dial indicator late, or may not notice the dial indicator at all. Finally, the waitstaff may notice the dial indicator but purposefully ignore it, presuming, perhaps correctly, that the dial indicator is not accurate. As a result, it is difficult to ensure consumers that they will receive a fresh cup of coffee.

Another device to prevent broken-down coffee from being served is disclosed in U.S. Pat. No. 4,298,143 to Peterson, which shows a coffee pot stopper device having a pouring passage that is closed by a valve vane after a timer has expired, thereby preventing coffee from being poured from the pot. Several problems exist with the Peterson device. For example, the device must be removed each time coffee is added to the pot such as when the coffee pot is placed under a brewing machine. In addition, the device might close as a waitperson is pouring a cup of coffee for a patron. Further, the device must be set by a waitperson when coffee is introduced to the pot, which the waitperson may forget to do or delay doing. Finally, the device is bulky and contains moving parts that are likely to become soiled or rusted.

As consumers increasingly are demanding freshly brewed coffee, it is imperative for restaurants and cafes to provide quality controls to serve patrons as freshly brewed coffee as possible. To that end, it would be desirable to provide a device that attaches to a coffee pot, automatically keeps track of the length of time since the coffee was brewed, and indicates to the waitstaff when to throw the coffee out and brew a fresh pot.

SUMMARY OF THE INVENTION

A quality control apparatus is provided for a beverage held in a beverage container. The apparatus includes a sensor configured to be in thermal communication with the beverage and detect attainment of a first predetermined temperature. Typically, the sensor is mounted in an interior of the beverage container. Alternatively, the sensor may be mounted in operative thermal contact with an outer surface of the beverage container. The apparatus also includes a timer coupled with the sensor. The timer is configured to commence timing in response to detection of the attainment of the first predetermined temperature by the sensor. The apparatus also typically includes an indicator mountable on the beverage container. The indicator is coupled to the timer and configured to indicate to a user a status of the timer. Typically, the status of the timer is an indication whether a predetermined interval of time has expired. Alternatively, the status may be an elapsed time.

A method of timing freshness of a beverage in a beverage container also is provided. The method includes detecting presence of the beverage in the beverage container by sensing attainment of a first predetermined temperature in the beverage container, commencing timing in response to detecting presence of the beverage, and indicating to a user by an indicator mounted to the beverage container a status of the timing. Typically, commencing timing includes commencing timing of a predetermined interval. The method also typically includes determining whether a sensor detects attainment of a second predetermined temperature in the beverage container. If the sensor detects attainment of the second predetermined temperature, the method typically includes stopping timing. If the sensor does not detect attainment of the second predetermined temperature, the method typically includes detecting expiration of the predetermined interval, and indicating to the user by the indicator mounted to the beverage container that the predetermined interval has expired.

DETAILED DESCRIPTION OF THE PREFERRED EMBODIMENT

Figure 1:
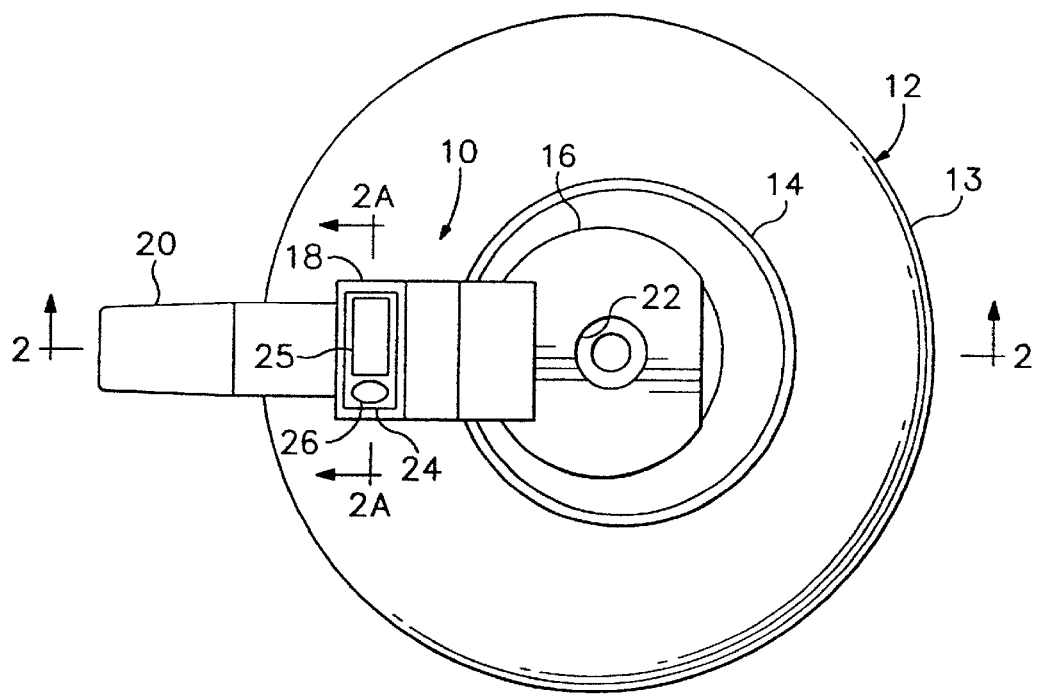
FIG. 1 is a top view of an embodiment of the present invention, installed in a round coffee pot.
Figure 2:
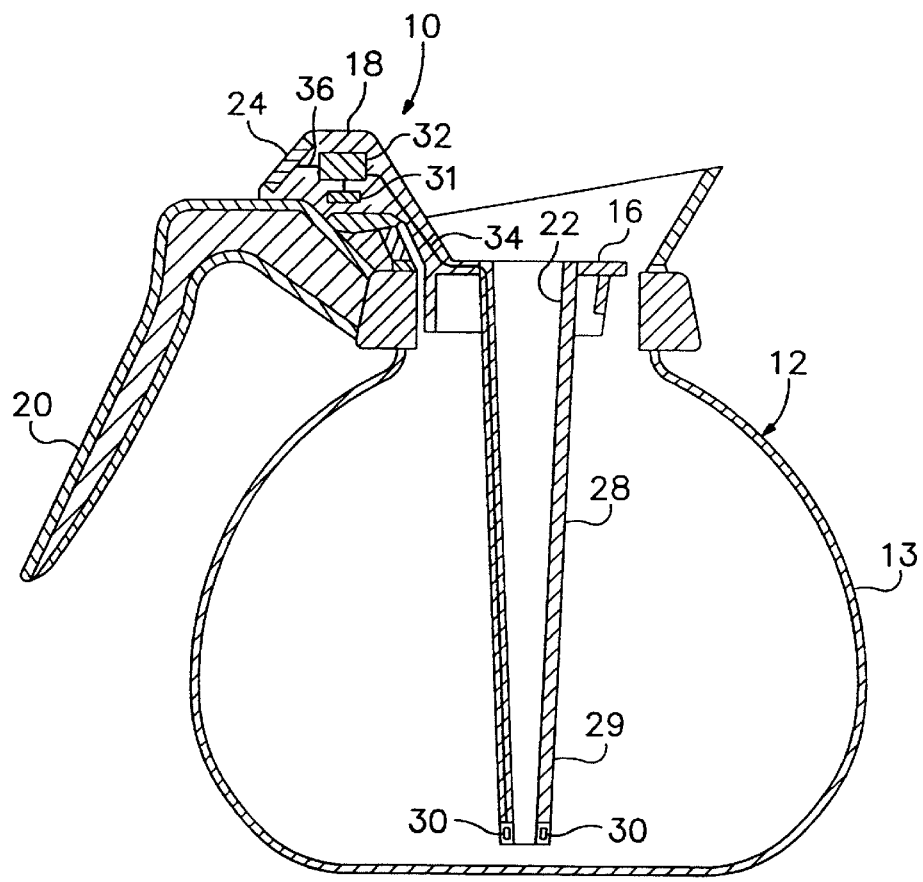
FIG. 2 is a first cross sectional view of the embodiment of FIG. 1.
Figure 3:
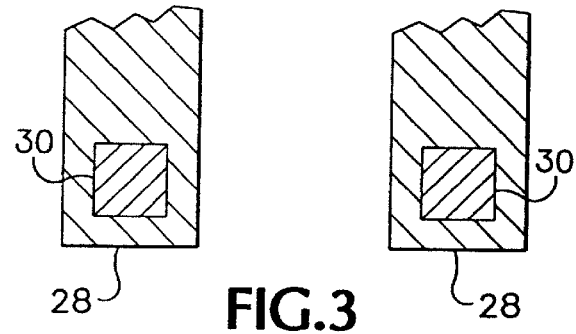
FIG. 3 is a detail view of a sensor of the embodiment of FIG. 1.

Referring initially to FIGS. 1–3, one possible embodiment of the present invention is shown. Quality control apparatus 10 typically is designed to fit within beverage container or coffee pot 12 by lodging snugly within mouth 14. Apparatus 10 typically includes a base portion 16 configured to fit within mouth 14 and an arm portion 18 extending from base portion 16 to attach to a handle 20 of coffee pot 12. While the beverage container will herein be described as a coffee pot and its contents referred to as coffee for purposes of illustration, it will be appreciated that the present invention may be practiced on virtually any container holding virtually any beverage.

Figure 2A:
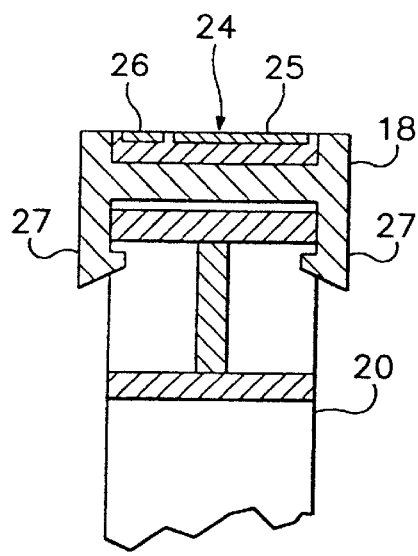
FIG. 2A is a second detailed cross sectional view of the embodiment of FIG. 1.

Base portion 16 typically includes a hole 22 through which brewed coffee may pass when the coffee pot is placed under a brewing machine. Arm portion 18 includes an indicator 24 for alerting the user that the coffee in the pot is old and must be replaced. Indicator 24 may include a visual display 25, such as an LCD display. Indicator 24 also may include a speaker 26 or other sound emitting device. As shown in FIG. 2A, typically arm 18 is provided with clips 27 for attaching to handle 20.

As shown in FIG. 2, apparatus 10 further includes a neck portion 28 (or probe) extending downward into receptacle 13 of coffee pot 12. The neck portion is typically hollow and connects hole 22 to a bottom region of pot 12. Neck portion 28 also may be referred to as mixing member 28, as the neck portion introduces brewed coffee to a bottom region of the coffee pot to induce mixing currents in the coffee contained within coffee pot 12.

As shown in detail in FIG. 3, sensor 30 is situated adjacent a distal end 29 of neck portion 28, in an interior of coffee pot 12. Sensor 30 is configured to be in thermal communication with a beverage in the coffee pot, such that heat energy from the beverage is transferred directly or indirectly to the sensor. Alternatively, sensor 30 may be situated anywhere within coffee pot 12, or may be placed adjacent an outside surface of the coffee pot. In the embodiment shown in FIG. 3, sensor 30 is surrounded entirely by plastic material of neck portion 28, and senses heat transferred from coffee contained in pot 12 through the plastic of the neck portion.

Sensor 30 is a thermal sensor configured to sense changes in temperature. Sensor 30 typically is a resistance temperature detector (RTD) sensor. Alternatively, a thermocouple, thermister, or any other heat-detecting sensor commonly understood in the electronic arts may be used.

Figure 6:
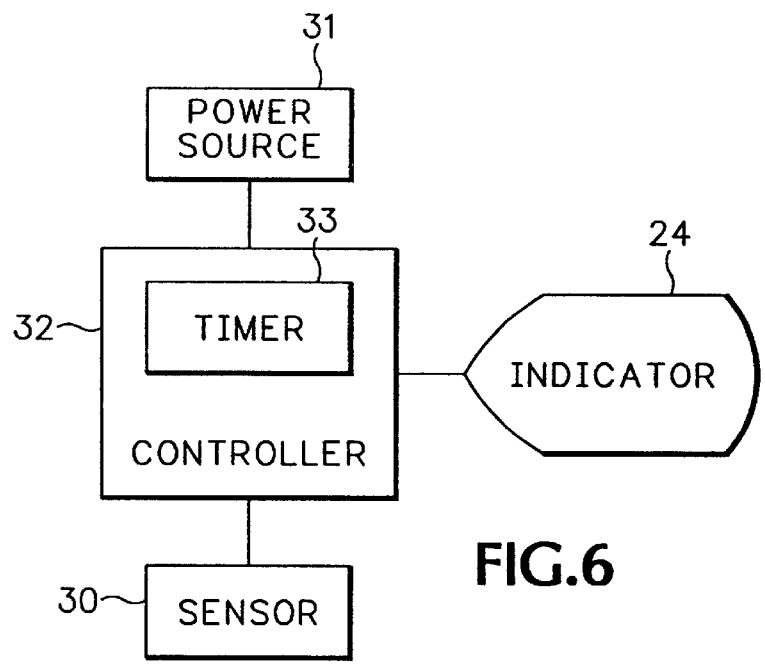
FIG. 6 is a schematic view of the present invention.

Sensor 30 is coupled to a controller 32 via a first connector 34. Controller 32 typically is an application-specific integrated circuit (ASIC). Alternatively, controller 32 may be virtually any firmware, logic circuit, or other electronic componentry suited to link the sensor, timer, and indictor. Controller 32 in turn is coupled to indicator 24 via a second connector 36. Typically the first connector is molded into the plastic of neck 28, and the second connector is molded into the plastic of arm 18. As shown in FIG. 6, controller 32 also typically includes a timer 33, and is coupled to a power source 31, such as a battery.

Figure 4:
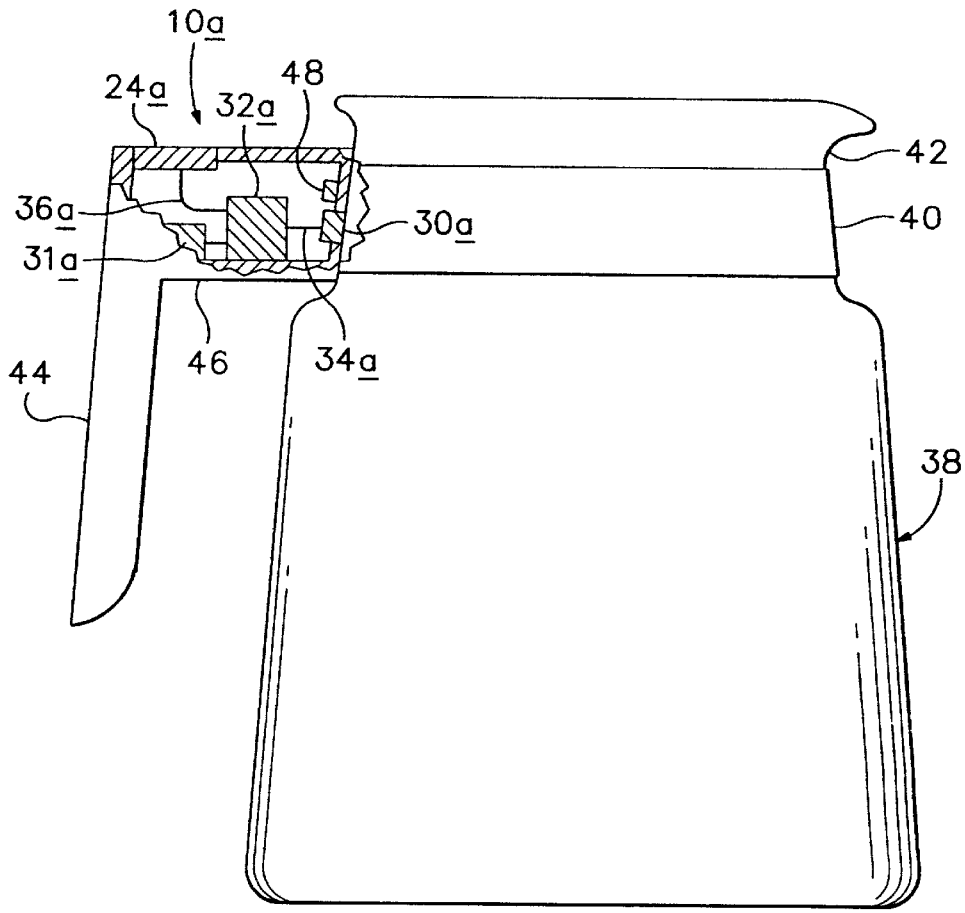
FIG. 4 is a side view of another embodiment of the present invention, installed on a generally cylindrical coffee pot.
Figure 5:
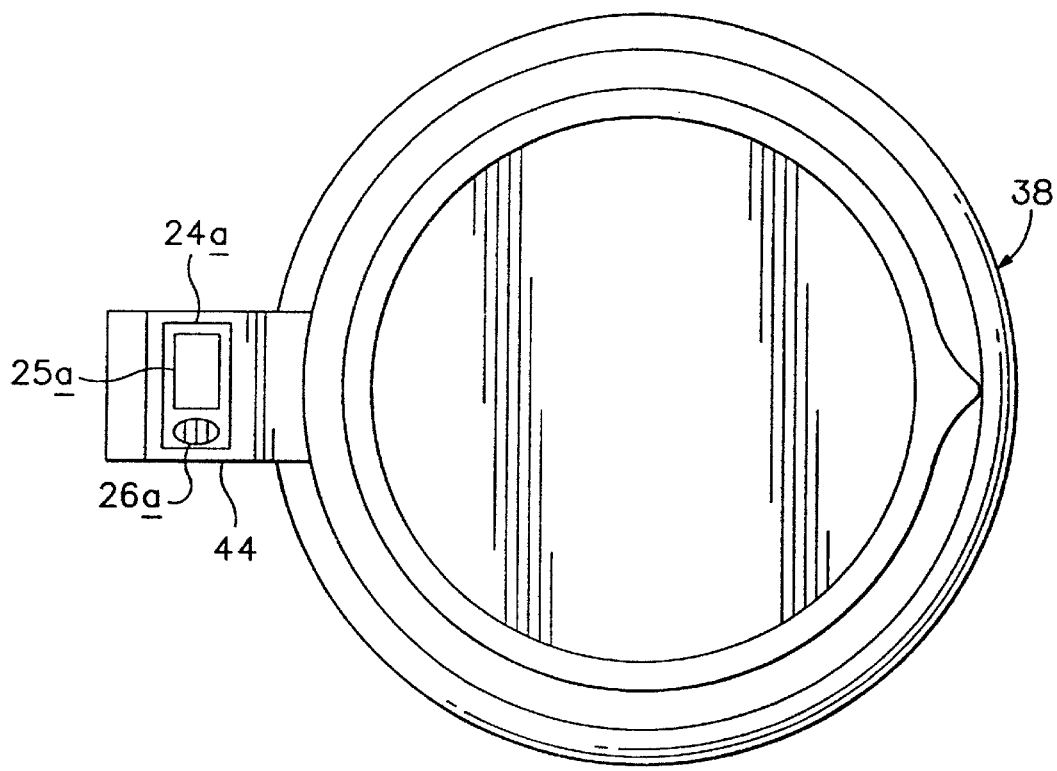
FIG. 5 is a top view of the embodiment of FIG. 4.

Referring now to FIGS. 4 and 5, another embodiment 10a according to the present invention is shown. Parts similar to the embodiment shown in FIGS. 1–3 are labeled with identical numerals and an additional letter designation. Quality control apparatus 10a attaches to generally cylindrically shaped beverage container or coffee pot 38 via band 40 which extends around a neck portion 42 of beverage container 38. Apparatus 10a typically includes a base 46 mounted to coffee pot 38 by band 40. Base 46 typically is mounted to band 40 by rivet 48. Alternatively another fastening mechanism may be used. Handle portion 44 typically extends downward from base 46 and is configured to be grasped by the hand of a user.

Apparatus 10a typically includes a sensor 30a configured to be in operative thermal contact with the side of coffee pot 38. Sensor 30a may contact coffee pot 38 directly, or may contact a heat-transferring component located intermediate coffee pot 38 and sensor 30a. Sensor 30a typically is coupled to a controller 32a by a first connector 34a Controller 32a, in turn, is coupled to indicator 24a by a second connector 36a. Controller 32a also typically is connected to a power source 31a, such as a battery. Indicator 24a typically includes a visual display 25a and/or a speaker 26a.

Figure 7:
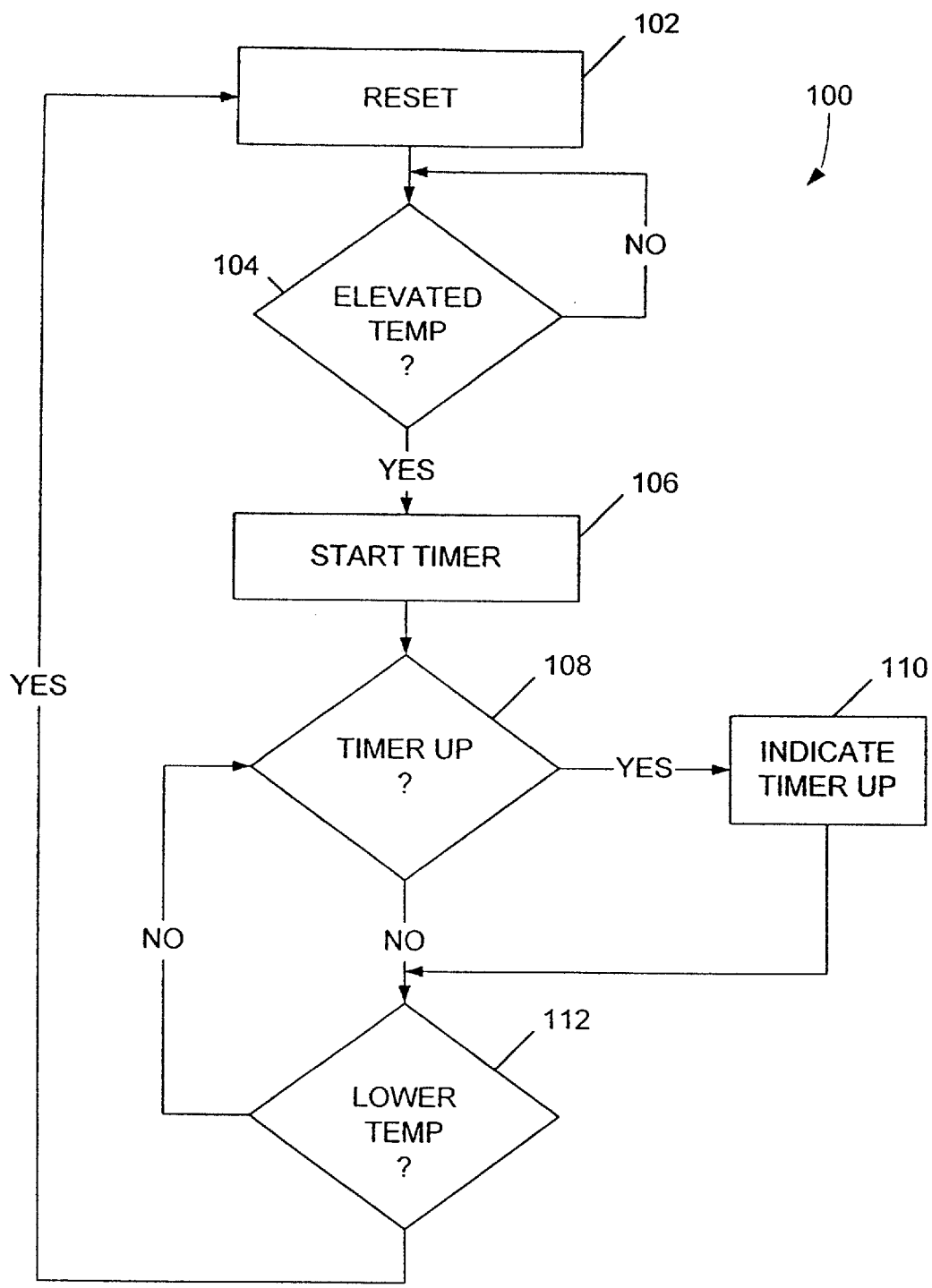
FIG. 7 is a flowchart of a method according to the present invention.

Referring now to FIG. 7, a method 100 of operation for the present invention is illustrated. At 102, the timer and indicator are reset. Typically, controller 32 resets timer 33 to zero. Where the indicator includes a display, controller 32 typically resets the display to be blank. Alternatively, the display may be reset to display a predetermined message. Where the indicator includes a speaker, controller 32 typically resets the speaker to be turned off.

At 104, hot, freshly brewed coffee is detected in coffee pot 12 by detecting attainment of a first predetermined temperature with sensor 30. For the embodiment shown in FIGS. 1–3, the first predetermined temperature typically is 130° F. For the embodiment shown in FIGS. 4–5, the first predetermined temperature typically is slightly lower, at 110° F., as the heat from the coffee must be conducted through the glass to reach the sensor. Alternatively, either embodiment may use a higher or lower first predetermined temperature, ranging from slightly above a predetermined ambient temperature of the room to the boiling point of coffee may be used. The sensor detects attainment of the first predetermined temperature by detecting a temperature at or above the first predetermined temperature. If the first predetermined temperature is not detected, the controller typically continues to sense for the first predetermined temperature in an endless loop. Alternatively, the user can selectively turn the Quality control apparatus on or off Typically, the sensor is in thermal communication with the beverage, such that the sensor may detect heat transferred from the beverage, when the beverage is in the container. The sensor may detect heat transferred through the neck or base, through the coffee pot, or through virtually any other heat-conducting structure. Depending on the proximity of the sensor to the beverage and the conductive properties of any materials separating the sensor and the beverage, the first predetermined temperature may be adjusted higher or lower.

At 106, once the first predetermined temperature is detected, the timer is started. Typically, controller 32 starts timer 33 to time a predetermined interval within which the coffee should be served, such as 30 minutes. Alternatively, the timer may be started with no predetermined interval. Other longer or shorter predetermined intervals also may be used, such as 15 minutes, or one hour.

At 108, expiration of the predetermined interval typically is detected. If the predetermined interval has expired, the controller, at 110, instructs the indicator to indicate to the user by a visual and/or aural message that the interval has expired. Typically, the indicator is an LCD display configured to display a message, such as "THROW OUT", thereby instructing the user to dispose of the coffee in the coffee pot and cease serving it to patrons. Alternatively, the indicator may emit a beep or prerecorded message instructing the user to throw the coffee out. Virtually any type of visual or aural message may be used. Where no predetermined interval is set, the user may monitor an elapsed time of the timer to determine age of the beverage.

Whether or not the predetermined interval expires, at 112, the sensor attempts to detect attainment of a second predetermined temperature. Typically, this second predetermined temperature is approximately 90° F., but may be virtually any temperature lower than the first predetermined temperature and above a room ambient temperature. This range is chosen such that the sensor will detect, for example, rinsing of the coffee pot with cool or warm water. Alternatively, the second predetermined temperature may be at or lower Man the room ambient temperature. Typically, the sensor detects attainment of the temperature by detecting a temperature at or lower than the second predetermined temperature. If the second predetermined temperature is reached, the apparatus typically automatically resets at 102. If the second predetermined temperature is not reached then the controller continues to examine whether the predetermined interval has expired, at 108, and, if it has, instruct the indicator to display an appropriate indication at 110.

Alternatively, the sensor may be used to detect whether a cool beverage, such as a milk-based beverage, has warmed while being held in a beverage container such as an air pot. In this case, attainment of the first predetermined temperature is detected by sensing a temperature at or below the first predetermined temperature. Typically, the first predetermined temperature will be set near a predetermined holding temperature of a milkbased beverage, such as 41° F., such that the sensor will detect presence of the cool beverage in the beverage container. Typically, the controller will instruct the indicator to display a message, such as "THROW OUT," to the user if the sensor subsequently detects a temperature above the predetermined holding temperature. Alternatively, in response to the sensor detecting attainment of the predetermined holding temperature, the timer may start timing a predetermined interval for which the beverage may be held at the predetermined holding temperature. The controller in turn may instruct the indicator to display a message to the user after the predetermined interval has expired indicating that the beverage should be discarded.

Where the sensor is used to detect warming of a cool beverage, the second predetermined temperature typically is above the first predetermined temperature. In this case, the sensor typically is configured to detect attainment of the second predetermined temperature by sensing a temperature at or above the second predetermined temperature. Typically, the second predetermined temperature is set near the temperature of warm water, for example 70° F., such that the timer will reset when the beverage container is washed out with warm water.

Typically, the first predetermined temperature value, predetermined interval value, and second predetermined temperature value are preset into the controller, and not programmable by a user. Alternatively, some or all of these parameters may be reprogrammed by a user via a user interface, such as a select button and a display.

According to the above described operational method, the present invention typically provides a timer configured to activate upon sensing attainment of a first predetermined temperature from a beverage in a beverage container, and indicate to the user that a predetermined interval of time has expired. The timer also may reset itself automatically when attainment of a second predetermined temperature is sensed, such as when the beverage container is rinsed with water.

While the invention has been disclosed in its preferred form, the specific embodiments thereof as disclosed and illustrated herein are not to be considered in a limiting sense as numerous variations are possible. The subject matter of the invention is regarded to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims are also regarded as included within the subject matter of applicant's invention irrespective of whether they are broader, narrower, or equal in scope to the original claims.

We claim:

1. A quality control apparatus for a beverage held in a beverage container, the apparatus comprising:
   a sensor configured to be in thermal communication with the beverage and to detect attainment of a first predetermined temperature;
   a timer coupled with the sensor, the timer being configured to commence timing in response to detection of the attainment of the first predetermined temperature by the sensor; and
   an indicator coupled to the timer and configured to indicate to a user a status of the timer.

2. The apparatus of claim 1, where the sensor is positioned within an interior of the beverage container.

3. The apparatus of claim 2, further comprising:
   an elongate probe configured to extend into the interior of the beverage container;
   where the sensor is positioned on the probe.

4. The apparatus of claim 3, where the sensor is positioned adjacent a distal end of the probe.

5. The apparatus of claim 3, where the probe defines a passage configured to direct beverage into an interior of the beverage container.

6. The apparatus of claim 1, where the sensor is configured to detect attainment of the first predetermined temperature by sensing a temperature greater than or equal to the first predetermined temperature.

7. The apparatus of claim 1, where the sensor is further configured to detect attainment of a second predetermined temperature, after detecting attainment of the first predetermined temperature, the timer being configured to stop in response to detection of the second predetermined temperature by the sensor.

8. The apparatus of claim 7, where the second predetermined temperature is less than the first predetermined temperature.

9. The apparatus of claim 8, where the sensor is configured to detect attainment of the first predetermined temperature by sensing a temperature greater than or equal to the first predetermined temperature, and where the sensor is configured to detect attainment of the second predetermined temperature by sensing a temperature less than or equal to the second predetermined temperature.

10. The apparatus of claim 1, further comprising:
    a base mounted on the beverage container, the indicator being positioned on the base.

11. The apparatus of claim 1, where the indicator includes a visual display.

12. The apparatus of claim 1, where the indicator includes a speaker.

13. The apparatus of claim 1, where the status of the timer is an indication of whether a predetermined time interval has elapsed.

14. The apparatus of claim 1, further comprising:
    a controller coupled to the sensor and the display, the controller being configured to start the timer upon detection of the first predetermined temperature, and to instruct the indicator to indicate when a predetermined interval of time has elapsed.

15. The apparatus of claim 1, where the sensor is positioned in operative thermal contact with an outer surface of the beverage container.

16. The apparatus of claim 1, further comprising:
a handle mounted to the beverage container, the indicator being mounted on the handle.

17. The apparatus of claim 16, wherein the sensor is mounted within the handle in operative thermal contact with an outer surface of the beverage container.

18. A method of timing freshness of a beverage in a beverage container, the method comprising:
detecting attainment of a first predetermined temperature in the beverage container;
commencing timing upon detecting attainment of the first predetermined temperature in the beverage container; and
indicating to a user by an indicator a status of the timing.

19. The method of claim 18, where commencing timing includes commencing timing of a predetermined time interval.

20. The method of claim 19, further comprising:
detecting attainment of a second predetermined temperature in the beverage container; and
upon detecting attainment of the second predetermined temperature, stopping timing.

21. The method of claim 20, where the second predetermined temperature is below the first predetermined temperature.

22. The method of claim 21, where detecting attainment of the first predetermined temperature includes sensing a temperature at or above the first predetermined temperature, and where detecting attainment of the second temperature includes sensing a temperature at or below the second predetermined temperature.

23. The method of claim 20, wherein indicating includes displaying a visual message on a display.

24. The method of claim 20, wherein indicating includes emitting an aural message from a speaker.

25. A beverage container for holding a beverage, comprising:
a receptacle, configured to hold the beverage;
a sensor thermally coupled with the receptacle, the sensor being configured to detect attainment of a first predetermined temperature within the receptacle;
a timer coupled with the sensor, the timer being configured to commence timing in response to detection of the attainment of the first predetermined temperature by the sensor; and
an indicator coupled to the timer and configured to indicate to a user a status of the timer.

* * * * *